(12) United States Patent
Schemmann et al.

(10) Patent No.: US 9,584,241 B2
(45) Date of Patent: Feb. 28, 2017

(54) FLOW CONTROL IN A NETWORK DEVICE

(71) Applicant: ARRIS Group, Suwanee, GA (US)

(72) Inventors: Marcel F Schemmann, Maria Hoop (NL); Benedict J Jackson, Beaverton, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 718 days.

(21) Appl. No.: 13/947,462

(22) Filed: Jul. 22, 2013

(65) Prior Publication Data

US 2013/0301659 A1    Nov. 14, 2013

Related U.S. Application Data

(62) Division of application No. 12/335,436, filed on Dec. 15, 2008, now Pat. No. 8,493,853.

(60) Provisional application No. 61/007,787, filed on Dec. 13, 2007.

(51) Int. Cl.
*H04J 3/16* (2006.01)
*H04L 25/02* (2006.01)
*H04L 12/801* (2013.01)
*H04J 3/06* (2006.01)

(52) U.S. Cl.
CPC .......... *H04J 3/1682* (2013.01); *H04J 3/0635* (2013.01); *H04L 25/0262* (2013.01); *H04L 47/10* (2013.01)

(58) Field of Classification Search
CPC ... H04J 3/1682; H04J 3/0635; H04L 25/0262; H04L 47/10
USPC .... 370/229, 230, 230.1, 232, 351, 389, 412, 370/413, 395.1, 395.4, 395.41, 464, 465, 370/468; 375/240, 240.1, 240.02, 240.01, 375/240.12
See application file for complete search history.

(56) References Cited

U.S. PATENT DOCUMENTS

| | | | |
|---|---|---|---|
| 4,783,791 A | 11/1988 | Yoshino | |
| 5,966,387 A | 10/1999 | Cloutier | |
| 5,987,518 A * | 11/1999 | Gotwald | H04L 29/06027 348/E5.008 |
| 6,226,265 B1 | 5/2001 | Nakamichi et al. | |
| 6,865,169 B1 * | 3/2005 | Quayle | H04L 63/083 370/335 |
| 7,424,080 B1 | 9/2008 | Liu | |
| 7,764,717 B1 | 7/2010 | Yu et al. | |
| 8,493,853 B2 | 7/2013 | Schemmann et al. | |
| 8,588,189 B2 * | 11/2013 | Lee | H04L 5/0007 370/329 |
| 2001/0040919 A1 | 11/2001 | An | |
| 2002/0006171 A1 | 1/2002 | Nielsen | |
| 2002/0080727 A1 | 6/2002 | Kim et al. | |
| 2002/0159389 A1 * | 10/2002 | Foster | H04L 49/357 370/230 |
| 2003/0043777 A1 * | 3/2003 | Koponen | H04L 1/1874 370/349 |
| 2003/0185238 A1 | 10/2003 | Strasser et al. | |
| 2004/0047410 A1 | 3/2004 | Choi et al. | |
| 2005/0238061 A1 | 10/2005 | Woodward | |
| 2005/0265254 A1 | 12/2005 | Yabuta et al. | |
| 2007/0153916 A1 | 7/2007 | Demircin et al. | |

(Continued)

*Primary Examiner* — Obaidul Huq
(74) *Attorney, Agent, or Firm* — Lori Anne D. Swanson

(57) ABSTRACT

A process of scheduling stream packets for output from a multiplexing network device involves prioritizing the output of packets first according to stream priority, and within a particular priority, by stream ID.

14 Claims, 5 Drawing Sheets

(56) References Cited

U.S. PATENT DOCUMENTS

| | | | |
|---|---|---|---|
| 2008/0095155 A1* | 4/2008 | Danzig | H04L 27/34 370/389 |
| 2008/0310460 A1 | 12/2008 | Bargauan | |
| 2009/0022136 A1* | 1/2009 | Joshi | H04B 7/2123 370/348 |
| 2013/0308654 A1 | 11/2013 | Schemmann et al. | |

* cited by examiner

FLOW CONTROL IN A NETWORK DEVICE

PRIORITY CLAIM

This application claims priority under 35 U.S.C. 121 as a divisional of prior U.S. application Ser. No. 12/335,436, filed on Dec. 15, 2008, which claims priority under 35 U.S.C. 119 to prior USA provisional application No. 61/007,787, filed on Dec. 13, 2007, each of which is incorporated herein by reference in its entirety.

TECHNICAL FIELD

The present disclosure relates to rate control in data networks.

BACKGROUND

Channel rate estimation is difficult in an MPEG system with high jitter at the packet input. Due to the high jitter it is not possible to acquire an exact input stream data rate before the data is played out.

Even when the play out rate is accurate there can be a difference in system clock of the stream source (e.g. the upstream video server) and the local system clock (e.g. the EQAM clock) on the order of 30 ppm. As a result, the play out rate can differ slightly from the net input data rate which will eventually lead to de-jitter buffer overflow or buffer underflow.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Figure 1:
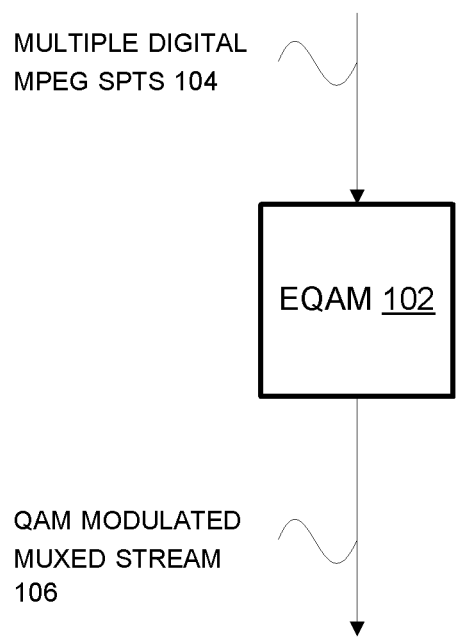
FIG. 1 is a block diagram of an embodiment of an EdgeQAM.

The procedures described herein may be implemented using logic in one or more network data processing devices, such as an Edge QAM (EQAM). An embodiment of such an EQAM is shown in the block diagram of FIG. 1. The EQAM device 102 receives multiple digital MPEG (Motion Picture Expert Group) Single Program Transport Streams (SPTS) 104 and multiplexes and Quadrature Amplitude Modulates (QAM) them together 106.

MPEG Remux Channel Rate Estimation Algorithm

Figure 2:
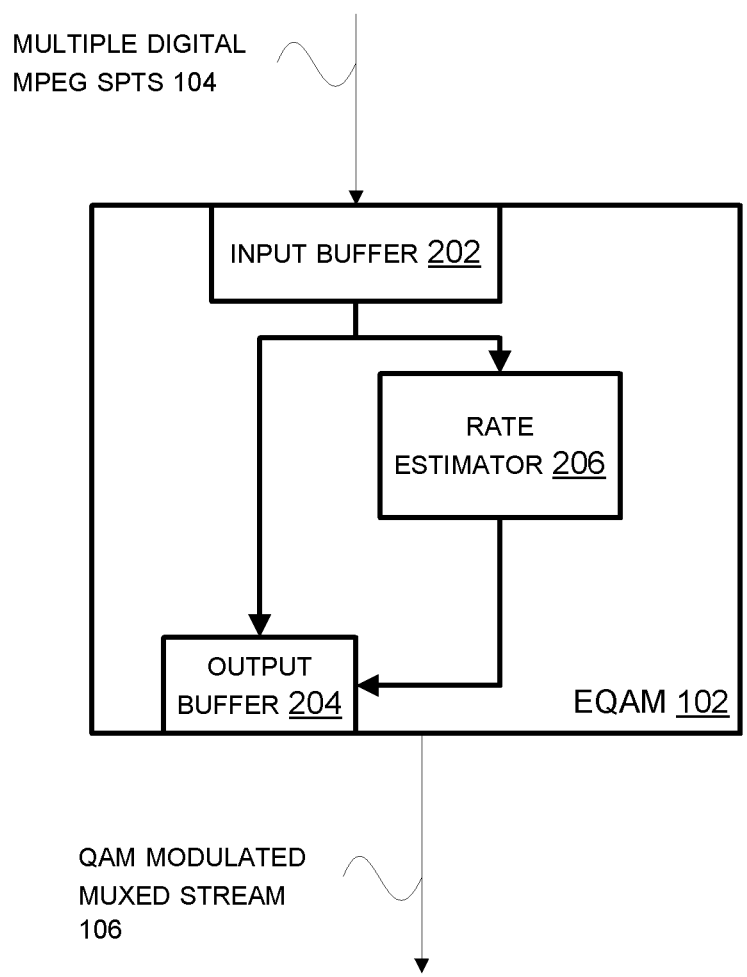
FIG. 2 is a more detailed block diagram of an embodiment of an EdgeQAM.

Embodiments of procedures are described herein that provide for a more shallow EQAM input buffer, due to the fact that the outgoing stream can be started and the Program Clock References (PCRs) of the output stream set even before a pair of PCRs are received at the input. FIG. 2 is a more detailed block diagram of an embodiment of an EdgeQAM 102, including an input buffer 202, output buffer 204, and a rate estimator 206.

Figure 5:
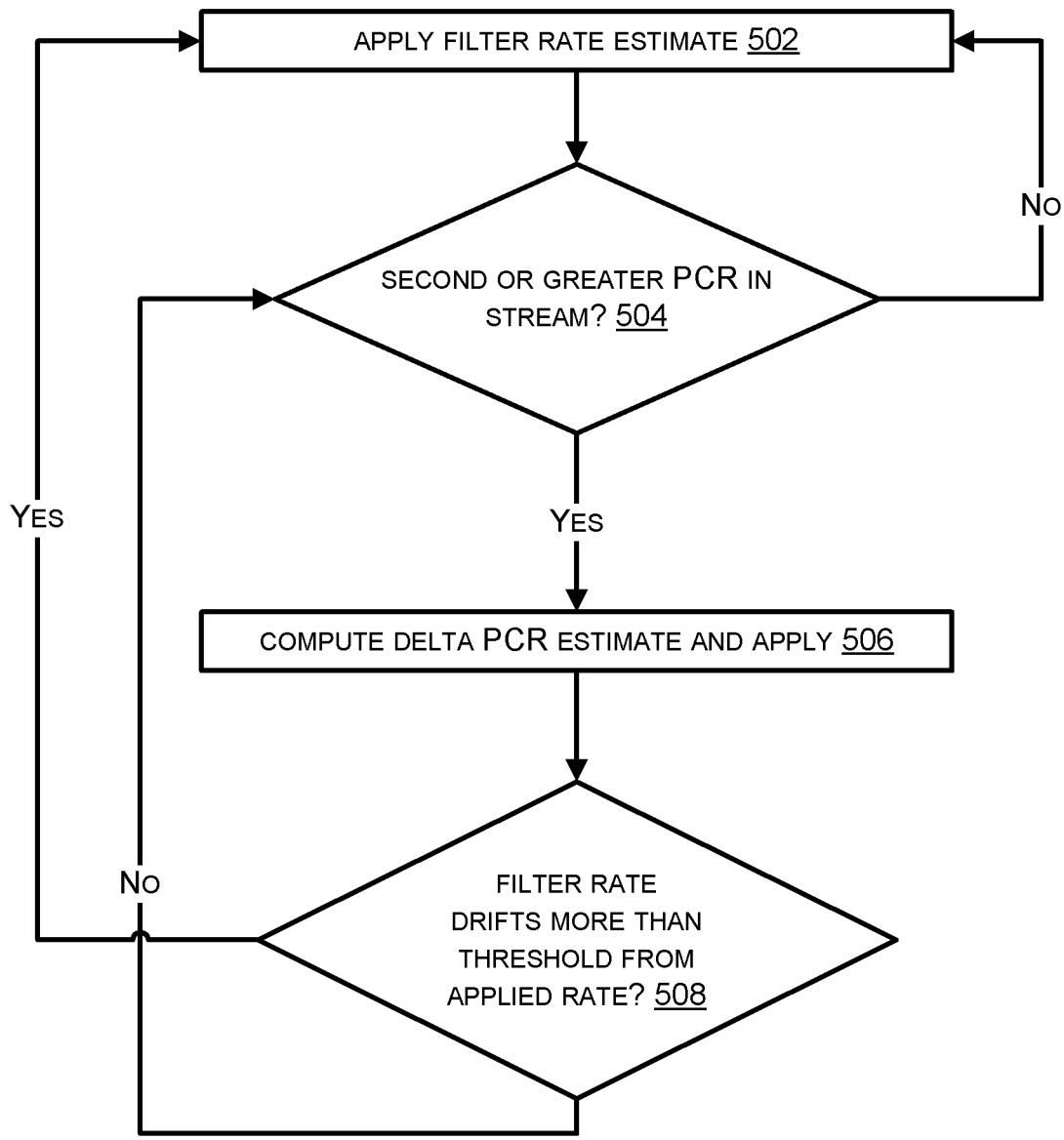
FIG. 5 is a flow chart of an embodiment of a process of setting an output rate for a stream.

Channel rate estimation is difficult in an MPEG system with high jitter at the packet input buffer 202. Due to the high jitter it is not possible to acquire an exact input stream data rate before the data is played out the output buffer 204. However it is still possible to start play out of the stream at a well-controlled rate by taking certain actions. FIG. 5 is a flow chart of a corresponding process embodiment. When the stream starts the input data rate is estimated with a rate filter 206 with variable bandwidth (502). The response time constant of the filter 206 is preferably increased in proportion to the amount of time that the rate was evaluated. The response time constant represents the time that the filter 206 needs to settle to its final value, this time constant roughly represents (in some embodiments) the time that the filter 206 needs to reach 63% of its final value. At a time equal to twice the response time constant the filter 206 will, in some embodiments, typically have reached 86% of its final value.

In the case of a Variable Bit Rate (VBR) stream (e.g. where bitrate is piece wise constant between PCR packets) this bandwidth is reset to a fast response at every PCR. Thus the response constant may increase between PCRs, then be reset to low value when a PCR arrives. For example the PCR-PCR time difference can be up to 100 msec, when a new PCR arrives the filter 206 time constant may be set to 4 msec and this gradually grows to 50 or 100 msec as time passes up to the moment that the next PCR is reached.

When stream play out starts, after a delay in a de-jitter buffer, the best available rate is used to play out the stream, this can be the result of an estimation of the rate filter 206 or a more accurate result, if available.

A better rate estimate than that from the rate filter 206 may be determined by computing the time interval between packets (e.g. between each pair of PCR packets) (504, 506). This rate is highly accurate and once it is available it can also be used to provide a corrected rate to the stream output buffer 204 such that the output timing is accurate when PCR packets are processed by the output buffer 204.

When the abovementioned accurate time is not available at the output buffer 204 then the output buffer 204 can continue streaming at the previous rate until a new accurate rate (e.g. from between a pair of PCR packets) is available, unless the rate filter 206 estimation shows that the actual rate has changed significantly enough to change the output rate to the estimated rate until a new accurate rate is available (508).

Figure 3:
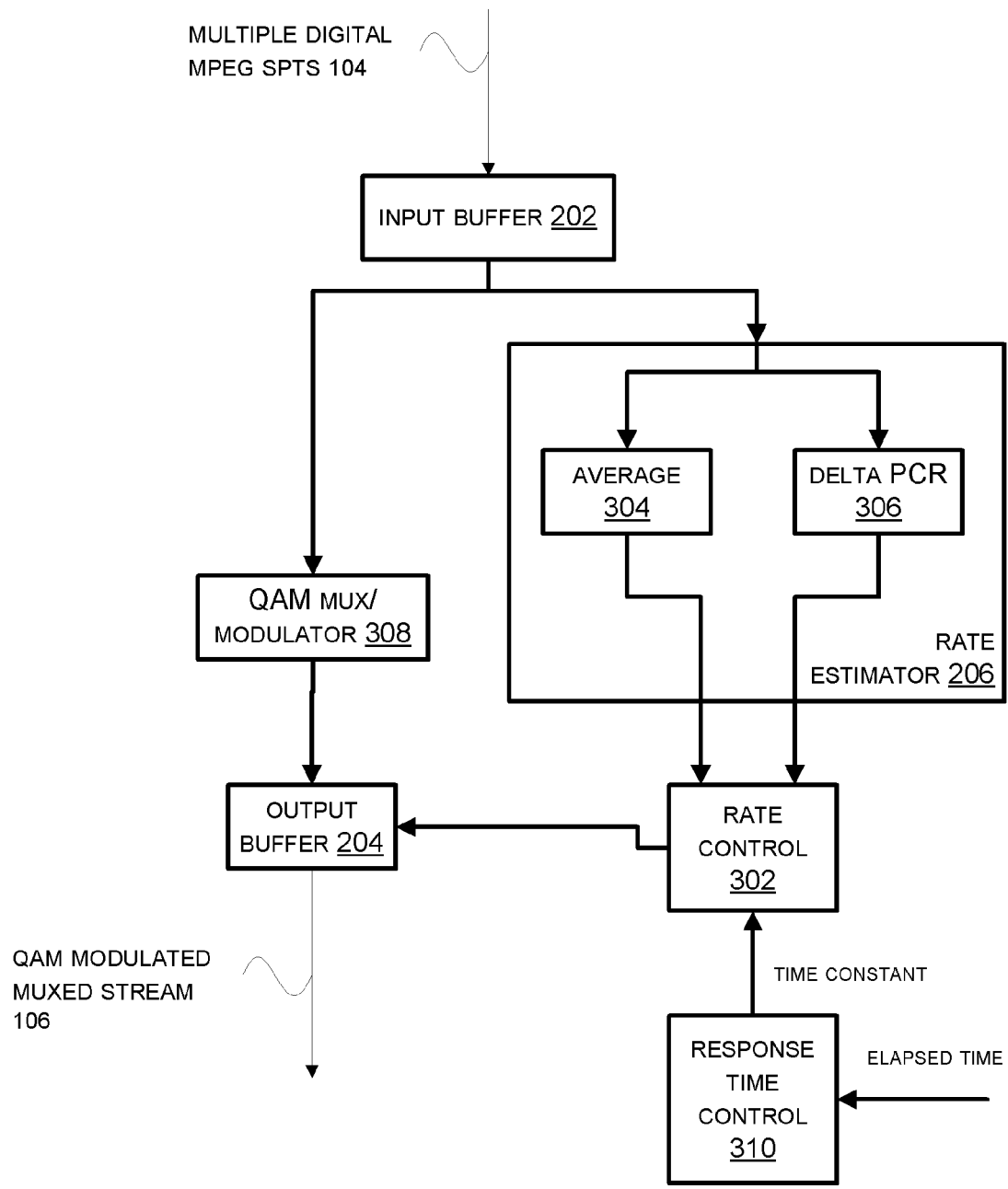
FIG. 3 is an even more detailed block diagram of an embodiment of an EdgeQAM.

For VBR input streams rate changes are expected and the threshold for detection of a significant rate change can be set lower than for a Constant Bitrate (CBR) stream, so the threshold for rate change detection should be adjustable. FIG. 3 is a block diagram of an embodiment of an EQAM showing features to carry out the rate control features described herein. The input data is modulated by the QAM modulator logic 308. The modulated data is played out of the output buffer 204. The rate estimator 206 includes a statistical (e.g. averaging) logic block 304 (which may comprise other than statistical heuristics) as well as a more accurate rate determination logic module (e.g. delta PCR) 306. If the estimator 206 can find a more accurate rate, for example by finding the time difference between PCR packets), this more accurate rate may be provided to the rate control logic 302, which in turn applies it to the output buffer 204. The response time of the rate control 302 and/or estimation logic 304 may also be controlled (e.g. via logic 310) for example as described below under the heading which follows.

Variable Bit Rate PCR Phase Lock Loop with Re-Stamping

The abovementioned embodiment for helps ensure accurate timing of the play out and time stamping of PCR packets. However even though this play out is accurate, there can be a difference in system clock of the stream source (e.g. the upstream video server) and the local system clock (e.g. the EQAM clock) on the order of 30 ppm. As a result of this, the play out rate can differ slightly from the net input data rate which will eventually lead to de-jitter buffer (e.g. input buffer 202) overflow or buffer underflow. In order to prevent buffer overflow or underflow the actual play out rate needs to be adjusted in a timely manner. On the other hand the input jitter, which in itself causes a fundamental uncertainty in input rate, should not cause significant output rate fluctuations. A tracking control loop may be employed that determines the integrated (accumulated) difference between packet input rate and output rate and this is used to control the output rate to minimize this difference. In order to attain a sufficiently fast response to avoid buffer overflow or underflow, the control loop response time constant is fast at stream start and then increases. It preferably increases proportional to the amount of time that the control loop has been active. This results in a desirable balance between response time and suppression of output rate variations due to the uncertainty in the input rate caused by the input jitter. Secondly, the control logic (e.g. logic 310) is limited in the rate at which it can change the output rate. This limitation will generally lead to loop instability and for this reason the loop bandwidth is coupled to the change rate limitation such that the loop bandwidth is reduced (time constant increased) when the change rate needs to be limited. This in itself reduces the change rate such that the change rate limitation can eventually be relaxed and the cause for loop instability is eliminated. Thus a stable control system can be designed that minimizes response time constant and at the same time ensures a sufficiently damped and slow system response such that the rate of change of the output rate is limited under operating conditions. In addition, the system can keep track of the time elapsed in a mode where the bandwidth was reduced to limit change rate and postpone further bandwidth reduction for an amount of time proportional to this time. This further optimizes the trade off between input rate capture and tracking and input jitter suppression. In various embodiments, the control logic 310, rate control 302, and/or estimator 206 may each or together include logic for these described purposes.

MPEG Channel Output Scheduling

Output packet scheduling may, in some embodiments, be based on priority settings and stream ID. The output 204 buffer may contain packets of various streams and it is drained at a certain average rate. When packets are presented to the output buffer 204 the buffer 204 may accept these packets, when it has space, in a novel manner as described below.

Figure 4:
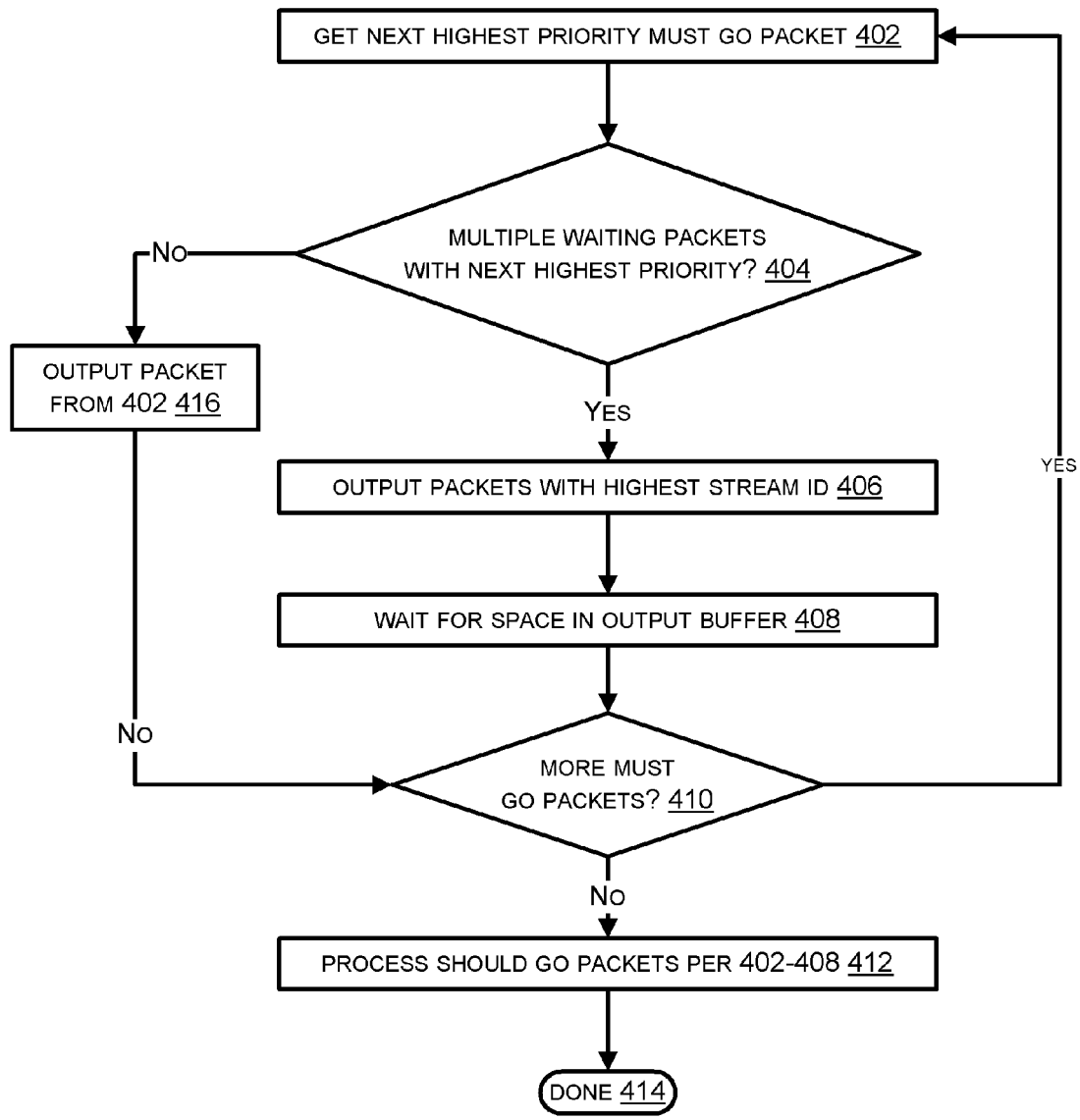
FIG. 4 is a flow chart of an embodiment of a process of prioritizing the output of must-go stream packets.

For packets that are scheduled to play out, it is determined if these packets 'should be' played out, or 'must be' played out, usually based on how many packets are scheduled for a stream or how old are the scheduled packets. First, the packets that 'must be' played are handled as follows and as illustrated in the flow chart embodiment of FIG. 4.

The 'must go' packets of the highest priority are accepted first (402). If there are no other packets with this priority, the packet is output (416).

Contention among these packets is resolved by streaming packets according to stream ID order (e.g. highest stream ID first, or lowest stream id first) (404, 406). It may be necessary to wait for space in the output buffer (408).

If there are more packets to go out (410), the process continues. Next packets of the next lower priority are accepted, again resolving contention according to stream ID order This is repeated for all lower priorities Then the 'should go' packets are sent out according to the same principles. (412)

In one embodiment, if two packets have the same priority, the one with higher stream id goes out first, then the next one. If two packets must go out at the same time then there is contention, and at least one will have to wait, hence the packet from the lower-ID stream is temporarily blocked (in this embodiment). Note that typically, the packets that 'should go' out are usually played out all the time and rarely does the situation occur that packet(s) that 'must go' out are present because they have been waiting too long, etc. When two or more packets 'should go' out, they may be played out in order of priority with contention resolved according to stream ID. Typically under this scenario, nothing gets blocked. Any blocked packet will be one with lower priority and/or stream ID. When this occurs, the stream may be blocked from entering the output buffer 204 until that buffer has recovered to an acceptable level.

This process protects high priority streams from getting impacted by over subscription of content on any output. Contention resolution based on stream ID helps ensure that even when streams have the same priority, only one stream will get affected in case the output cannot handle the amount of packets that are offered. All the other streams will continue to be processed without delay. Another factor to consider in the priority scheme in some embodiments is stream rate, such that channels with a higher stream rate have higher priority.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A process of scheduling stream packets for output from a multiplexing network device, the process comprising:
   receiving packets of an input stream at the multiplexing network device, the packets including a stream ID;
   assigning values of 'must go' and 'should go' to the output packets, wherein the value of 'must go' or 'should go' is determined based on at least one of: a number of packets scheduled for a stream or for how long packets have been scheduled;
   prioritizing a first type of packets higher than a second type of packets; and
   prioritizing an output of packets within each type of packet first according to stream priority, and within a particular priority, by stream ID, wherein 'must go' packets are selected for output in order of highest to lowest priority, and within a priority, by stream ID, and 'should go' packets are selected for output in order of highest to lowest priority, and within a priority, by stream ID.

2. The process of claim 1, wherein the first type of packets are 'must go' packets and the second type of packets are 'should go' packets such that the 'must go' packets are prioritized higher than 'should go' packets.

3. The process of claim 2, further comprising:
   further prioritizing the output of packets by stream rate.

4. The process of claim 1, further comprising:
   starting an output stream from the network device based on the input stream before a pair of Program Clock Reference packets are received in the packets of the input stream.

5. The process of claim 1, further comprising:
   the network device is an EQAM.

6. The process of claim 5, further comprising:
the packets belong to multiple digital MPEG streams which are multiplexed together by the EQAM.

7. The process of claim 1, further comprising:
packets belonging to streams having a higher stream rate are assigned a higher priority.

8. A network device, comprising:
an input buffer to receive packets of inputs streams into the device;
an output buffer to transmit packets out of the device;
at least one of machine memory and circuits comprising logic adapted to:
    cause the device to move packets from the input buffer to the output buffer;
    cause the device to assign values of 'must go' and 'should go' to the output packets, wherein the value of 'must go' or 'should go' is determined based on at least one of: a number of packets scheduled for a stream or for how long packets have been scheduled,
    cause the device to prioritize a first type of packets higher than a second type of packets; and
    cause the device to prioritize packets of the output buffer within each type of packet for transmission first according to stream priority, and within a particular priority, by stream ID, wherein 'must go' packets are selected for output in order of highest to lowest priority, and within a priority, by stream ID, and 'should go' packets are selected for output in order of highest to lowest priority, and within a priority, by stream ID.

9. The device of claim 8, wherein the first type of packets are 'must go' packets and the second type of packets are 'should go' packets, such that the logic is adapted to cause the device to prioritize 'must go' packets higher than 'should go' packets.

10. The device of claim 9, further comprising:
the logic adapted to cause the device to further prioritize the output of packets by stream rate.

11. The device of claim 8, further comprising:
the logic adapted to cause the device to receive packets of an input stream to the device;
the logic adapted to cause the device to start an output stream based on the input stream from the device before a pair of Program Clock Reference packets are received in the packets of the input stream.

12. The device of claim 8, further comprising:
the device is an EQAM.

13. The device of claim 12, further comprising:
the packets belong to multiple digital MPEG streams; and
the logic adapted to cause the EQAM to multiplex the multiple streams together.

14. The device of claim 8, further comprising:
the logic adapted to cause the device to assign a higher priority to packets belonging to streams having a higher stream rate.

* * * * *